US008120617B2

(12) United States Patent
Tin et al.

(10) Patent No.: US 8,120,617 B2
(45) Date of Patent: Feb. 21, 2012

(54) COLOR CONVERSION WITH MANY INPUT CHANNELS

(75) Inventors: Siu-Kei Tin, Milpitas, CA (US); Todd D. Newman, Palo Alto, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 1309 days.

(21) Appl. No.: 11/042,106

(22) Filed: Jan. 26, 2005

(65) Prior Publication Data
US 2006/0164430 A1     Jul. 27, 2006

(51) Int. Cl.
*G09G 5/02* (2006.01)
(52) U.S. Cl. ........................................ 345/602
(58) Field of Classification Search .................. 345/602
See application file for complete search history.

(56) References Cited

U.S. PATENT DOCUMENTS

| | | | | | |
|---|---|---|---|---|---|
| 4,941,039 | A | * | 7/1990 | E'Errico | 358/518 |
| 5,432,906 | A | * | 7/1995 | Newman et al. | 345/501 |
| 6,122,012 | A | * | 9/2000 | Segman | 348/576 |
| 6,172,692 | B1 | * | 1/2001 | Huang et al. | 347/43 |
| 6,266,165 | B1 | * | 7/2001 | Huang et al. | 358/520 |
| 6,335,800 | B1 | * | 1/2002 | Balasubramanian | 358/1.9 |
| 6,389,161 | B1 | * | 5/2002 | Krabbenhoft | 382/167 |
| 6,522,427 | B1 | * | 2/2003 | Bhattacharjya et al. | 358/1.9 |
| 6,546,132 | B1 | * | 4/2003 | Bhattacharjya et al. | 382/167 |
| 6,621,498 | B1 | * | 9/2003 | Handley et al. | 345/604 |
| 6,693,643 | B1 | * | 2/2004 | Trivedi et al. | 345/602 |
| 2002/0048031 | A1 | * | 4/2002 | Suwa et al. | 358/1.9 |
| 2005/0254073 | A1 | * | 11/2005 | Braun et al. | 358/1.9 |
| 2006/0041609 | A1 | * | 2/2006 | Pellar | 708/290 |
| 2006/0055946 | A1 | * | 3/2006 | Agar et al. | 358/1.9 |

OTHER PUBLICATIONS

Kang, H.R., "Color Technology for Electronic Imaging Devices," SPIE Optical Engineering Press (1997).
Allebach, J.P. et al., "Efficient Implementation of Nonlinear Color Transformations," *1st Color Imaging Conference Proceedings*, 143-148 (1993).
Bell, I.E et al., "Device Characterization Using Spline Smoothing and Sequential Linear Interpolation," *1st Color Imaging Conference Proceedings*, 143-148 (1993).
Yeung, C.T. et al., "Device Characterization Using Variable Rectilinear Interpolation," *5th Color Imaging Conference Proceedings*, 193-196 (1997).

* cited by examiner

*Primary Examiner* — Xiao M. Wu
*Assistant Examiner* — Edward Martello
(74) *Attorney, Agent, or Firm* — Fitzpatrick, Cella, Harper & Scinto

(57) ABSTRACT

A method and apparatus for color conversion useful for color devices having a large number of input channels, for example CMYK color printers having additional inks used to enhance the color printer's gamut. The color conversion is performed using a strata collection of look-up tables that stratify an n-dimensional color space into sets of lower dimensional subspaces. For lower dimension subspaces, the associated look-up tables may be closed, while for a higher dimension subspace, an associated look-up table may be open, leaving gaps in the subspace not enclosed by a look-up table. A color management module using the strata collection for color conversion may determine if a color conversion is for a color value that falls within a gap. If so, the color management module may use a relatively complex interpolation process. If not, the color management module may use a relatively simple interpolation process.

22 Claims, 6 Drawing Sheets

COLOR CONVERSION WITH MANY INPUT CHANNELS

BACKGROUND

1. Field of the Invention

The present invention relates generally to color conversion and more particularly to color conversion in higher dimensional color spaces.

2. Description of the Related Art

A conventional color printer system employs Cyan Magenta Yellow and blacK (CMYK) inks. To extend the range of colors that a color printer can produce, that is extend the gamut of colors the color printer can produce, one approach taken is to add new inks to the system. The inks typically added are colors that CMYK inks have difficulty reproducing. Common choices are orange, green, red, blue, etc. In another vein, in an attempt to increase the "apparent resolution" of the color printer, inks with different tints have been used, such as light cyan, light magenta, etc. In effect, the resulting color printer has more than four channels. After a decade's development of "high fidelity" printing, as printing using multi-channel systems such as CMYK systems that have been enhanced with additional inks is known, it is now common to encounter printers with more than four channels.

Color printers are peculiar in the sense that although the color printer is often the final output device, people are also interested in color conversion from the color printer's color space to another color device's color space. In the case of a CMYK color printer, one such transformation is from CMYK to XYZ, known as the "forward model" of the color printer. By combining the forward model with other transformations, it is possible to emulate CMYK prints on another device. For instance, a CMYK printer to Red Green Blue (RGB) monitor conversion would make it possible to proof the output of the CMYK printer on an RGB monitor. Similarly, the same applies to high fidelity printers. A CMYK Orange Green (CMYKOG) to RGB conversion would allow proofing of CMYKOG output on a RGB monitor.

A conventional approach of implementing such color conversion efficiently is via a uniform Look-Up Table (LUT). For example, in an International Color Consortium (ICC) profile for a CMYKOG printer, the ICC specification mandates a so-called A2B1 tag that stores a uniform LUT representing a uniform sampling in the CMYKOG device space of the forward model, which goes from CMYKOG to the ICC "Profile Connection Space" (either CIELAB or CIEXYZ). Also, the ICC link profile enables a direct transformation from CMYKOG device space to any color space including a device space, also in the form of a LUT sampled uniformly in CMYKOG space. Furthermore, sampling is never done with a high number of levels because of the large size of the resulting LUT, except in the case of monochrome devices (1 channel). Instead, sampling with lower levels is used, with typical choices of 9 levels, 17 levels, or 33 levels. With a lower number levels in each channel, the LUT is used in conjunction with an interpolation algorithm to produce the result if a requested level is in between two sampled levels. In short, LUT uniformly sampled in the source color space of the transformation followed by interpolation is mandated in ICC specification and is considered the industrial standard.

Beyond the ICC's approach of uniform LUT, it is noteworthy that other transform structures have been proposed. In the Sequential Linear Interpolation (SLI) structure, nodes of a "LUT" are not uniformly spaced but instead are placed strategically so that the resulting grid minimizes the interpolation error by following the characteristics of the underlying transformation, putting more nodes in places where the transformation varies more rapidly, less in places where the transformation varies slowly. In another approach called Variable Rectilinear Interpolation (VRI) structure, a non-uniform grid is constructed with the same objective as SLI, which is to minimize the interpolation error. However, the VRI node placement uses the idea of successive subdivision of rectangular cells, subdividing more times in places where the underlying transformation varies rapidly, less in times where the transformation varies slowly.

While a uniform LUT is conceptually simple and easy to implement, and interpolation on a uniform LUT is generally very efficient, the LUT size increases exponentially with the input dimension. In fact, if d is the number of steps used in the uniform LUT, and n is the number of channels in the source color space, then the number of nodes in the LUT is $d^n$. Clearly, the number of nodes quickly becomes so computationally demanding in storage/memory that computational resources may become strained. For high fidelity devices with six or eight channels, an ICC implementation of the device profile practically necessitates using fewer steps in the LUT, sometimes even down to 5 steps in the A2B1 table to keep the profile size within megabytes instead of gigabytes. Clearly, using smaller number of steps increases interpolation error, as there are now fewer sampling steps. Moreover, because the LUT is required to be uniform, this is an across-the-board degradation of accuracy over the whole color space, even in those regions of the space where a significant color difference can be caused by small change in the device value. Also peculiar to high fidelity devices is the fact that certain subspaces of the whole device space are more important than the others. For example, in CMYKOG space, cyan and green inks are seldom used together because their hues are largely overlapping each other, and the same goes for yellow and orange inks. A uniform reduction in the number of steps can be viewed as an overall degradation in quality across the whole color space, which is something that can be tolerated for the improbable ink combinations, but not for the likely/important combinations.

In either the SLI or VRI approach, the objective is to minimize the interpolation error, not to control the total number of nodes used in the LUT. They are mainly used in conventional color spaces such as RGB, CMYK or CIELAB, which have four or less channels. In fact, the objective of minimizing the interpolation error may result in a LUT that is bigger than it would be if uniform LUT was used.

Therefore, a need exists for a color conversion system for color printers having a large number of input channels that yields accurate color conversions yet is computational manageable. Various aspects of the present invention meet such a need.

SUMMARY OF THE INVENTION

A method and apparatus for color conversion useful for color devices having a large number of input channels, for example CMYK color printers having additional inks used to enhance the color printer's gamut, are provided. The color conversion is performed using a strata collection of look-up tables that stratify an n-dimensional color space into sets of lower dimensional subspaces. For lower dimension subspaces, the associated look-up tables may be closed and have a uniform grid structure. For a higher dimension subspace, an associated look-up table may be open, leaving gaps of the subspace not enclosed by the look-up table, and may have a non-uniform grid structure. A color management module using the strata collection for color conversion may determine if a color conversion is for a color value that falls within a gap. If so, the color management module may use a relatively complex interpolation process. If not, the color management module may use a relatively simple interpolation process.

In one aspect of the invention, a unit cube in an n-dimensional color space is stratified into a set of LUTs that span the unit cube, each LUT mapping from the color space to a second color space. In the method, a set of strata collections is defined for the n-dimensional color space, wherein, for each dimension k where k=3 to n dimensions, a strata collection is defined having n-choose-k LUTs. Each LUT has k inputs and at least some of the LUTs have a grid structure different from the other LUTs. Furthermore, the grid structure for higher dimension LUTs are less dense than lower dimension LUTs. The LUTs within the set of strata collections are then populated using color values from the second color space.

In another aspect of the invention, for each subspace of dimension 3, each LUT is closed and the grid structure for each LUT is uniform.

In another aspect of the invention, for each subspace of dimension 4, at least one LUT is closed and all other LUTs are open.

In another aspect of the invention, the grid structure for each closed LUT is uniform and the grid structure for each open LUT is nonuniform.

In another aspect of the invention, nonuniform grid structures are based on an array of specified device values.

In another aspect of the invention, for subspaces having greater than four dimensions, all of the LUTs are open.

In another aspect of the invention, the set of strata collections are used in a color management module. A color conversion process within the color management module uses a first interpolation process for closed LUTs and interior portions of open LUTs and uses a second interpolation process for spaces between an open LUT and a lower dimensional subspace. In this embodiment of the invention, the second interpolation process is more computationally complex than the first interpolation process.

This brief summary has been provided so that the nature of the invention may be quickly understood. A more complete understanding of the invention may be obtained by reference to the following detailed description in connection with the attached drawings.

DETAILED DESCRIPTION

Figure 1:
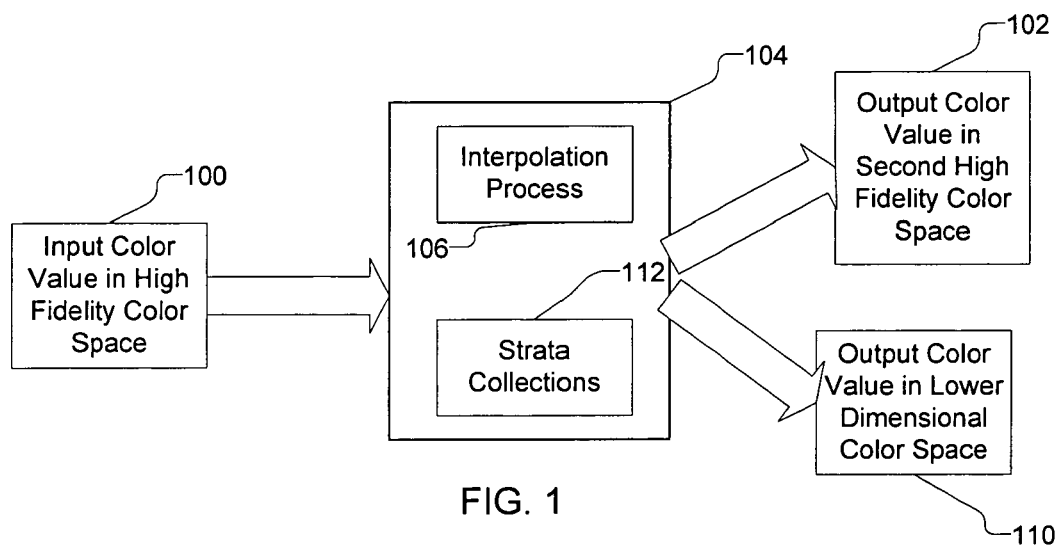
FIG. 1 illustrates transformation of color values between a higher dimensional color space and other color spaces in accordance with an exemplary embodiment of the present invention.

FIG. 1 illustrates transformation of color values between a high fidelity color space and another color space in accordance with an exemplary embodiment of the present invention. The present invention may be applied to color transformations from a high fidelity color space to another high fidelity color space or a color space having fewer dimensions. Accordingly, an input color value 100 in a high fidelity color space can be transformed into a second color value 102 in a second high fidelity color space. Alternatively, the input color value can be transformed into a color value 110 in a lower dimensional color space. To do so, a data processing system 108 uses an interpolation module 104. The interpolation module includes an interpolation process 106 that receives the first color value and uses a set of LUTs 108, herein termed a strata collection, to generate the second color value through interpolation.

In the above-described scenario, a uniformly sampled LUT may be used instead of the strata collections during the interpolation process. While a uniformly sampled LUT results in a simple and efficient interpolation process, such an approach imposes large memory requirements as the dimensionality of the color spaces goes up, sometimes referred to as "the curse of dimensionality." However, in reality, while a color device may have six or eight channels, these channels are rarely used simultaneously, for example, because of an ink coverage problem. Therefore, a simplifying assumption is that in most cases, the input color value to color value transformation has only a few "active" colorants and so the transformation actually resides in a lower dimensional color space. This also means that interpolation can be done more efficiently in that lower dimensional space because interpolation is faster the lower the dimension of the color space used.

Therefore, in accordance with various embodiment of the present invention, the whole device color space is stratified into subspaces of various dimensions. And because lower dimensions (combinations of three or four colorants mostly) are more important, by stratifying the color space, one can also use different sampling rates (for example, different number of steps) on the different portions of the stratified color space, such as increasing sampling rates for lower dimensional portions and reducing sampling rates for higher dimensional portions.

In order to describe the transformations in accordance with exemplary embodiments of the present invention, the following notation is used herein. n is the number of channels in the source color space of the color transformation that one wants to sample. In addition, one can simply refer to n as the input dimension, and $n \geq 5$ unless otherwise specified.

The basic building blocks of the strata collections are LUTs of various input dimensions and sizes, instead of one uniformly sampled LUT with input dimension n. To be precise, a "LUT", as used herein, is a rectangular lattice imposed on a unit hypercube, that is, all the color space coordinates are normalized to the range [0, 1]. If v is the input dimension of the LUT (note that v in general does not need to be equal to n, although all v≦n), then the LUT consists of v one-dimensional sampling grids:

$$Samp_i: x_1, x_2, \ldots, x_{d(i)}$$

where all the $x_j$'s lie in the range [0, 1], are strictly increasing with j, $d(i) \geq 1$ is the number of steps for the ith channel sampling, and $x_{d(i)}$ is 1. On the other hand, $x_1$ is not required to be 0.

As used herein, there are two special cases of LUTs as defined below.

A "Closed LUT" is a LUT with the additional requirement that for each $Samp_i$, $x_1=0$, and $d(i) \geq 2$. That is, the LUT is at least defined on all boundary faces of the unit hypercube. Furthermore, a uniform closed LUT is a closed LUT that has the same number of steps d(i) for each channel, and the nodes are uniformly spaced between 0 and 1.

An "Open LUT" is a LUT with the additional requirement that for each $Samp_i$, $x_1>0$. That is, an open LUT is not defined on the boundary faces of the unit hypercube that contain the origin. Furthermore, it is permissible to have only one step, that is, d(i)=1.

In one embodiment of the present invention, the unit hypercube $[0, 1]^n$ is stratified into a collection of closed LUT's and open LUT's such that the whole collection of LUTs will cover the unit hypercube. It is conceptually simpler to organize these "LUT strata" by their dimension, so that on the top level one can write:

$$[0, 1]^n = \bigcup_{k=3}^{n} \Sigma_k$$

where $\Sigma_k$ is the "k-dimensional strata collection." Note that the stratum dimension k starts from three instead of zero, which would correspond to points. This is because handling interpolation of three-colorant combinations is quite efficient without too much memory requirement. However, it is to be understood that lower dimensional strata collections are possible.

In one embodiment of the present invention, $\Sigma_3$ consists of closed LUT's with three inputs, one from every possible combination of three colorants chosen out of the n colorants. In addition, $\Sigma_4$ consists of 1 closed LUT's for the combination CMYK (or the first four colorants), together with $$\binom{n}{4} - 1$$

open LUT's for all other four-colorant combinations. This is because the CMYK combination is an important combination as it is the basis of most color printers. Finally, for k=5, ..., n, $\Sigma_k$ consists of $$\binom{n}{k}$$

open LUT's, one for each possible combination of choosing k colorants from the total of n colorants.

After establishing the nature of the LUTs, it remains to specify the sizes of the LUTs. One difference between open and closed LUT's is that open LUT's don't overlap with each other, whereas closed LUT's may overlap with each other at the boundary faces. The fact that the 1-D sampling in an open LUT does not contain "0" essentially means that an open LUT is missing half of the boundary faces, hence the name "open". If two LUTs don't overlap, one is free to use different number of steps and node locations in each channel. The same is not true if two LUTs overlap. In that case, if the number of steps and/or node locations are different, a point lying in the intersection of the two LUTs will receive a different interpolation value depending on which LUT is used in the interpolation. In one embodiment of the present invention, uniform sampling is used with the same number of steps whenever two LUT's overlap.

To summarize, all closed LUT's (all 3-colorant LUT's and the CMYK LUT in the present embodiment) are uniform, and have the same number of steps, which is denoted d.

Figure 2:
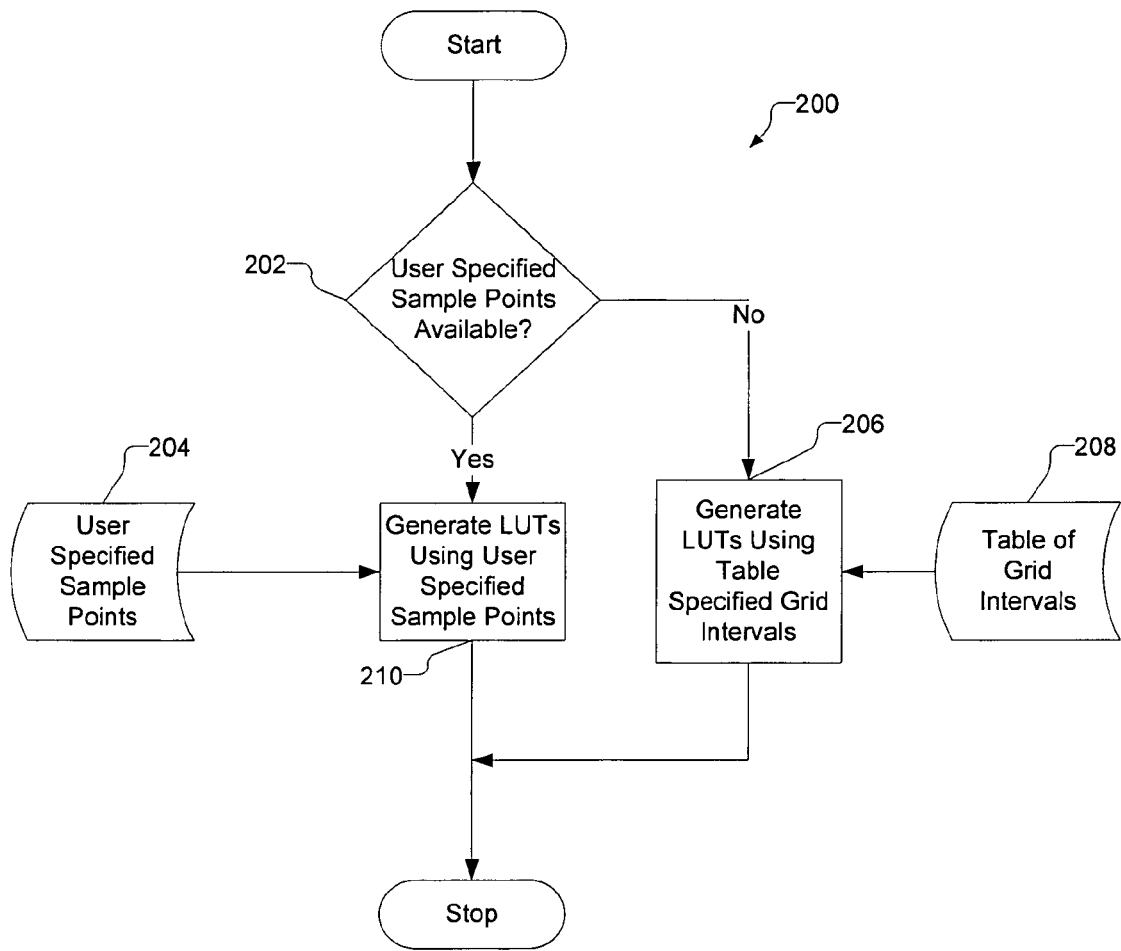
FIG. 2 is a process flow diagram of a process used to determine the number of steps d for closed LUTs and also number of steps and node locations for open LUTs in accordance with the present invention.

FIG. 2 is a process flow diagram of a process used to determine the number of steps d for closed LUTs and also the number of steps and node locations for open LUTs in accordance with the present invention. In the process 200, there are two distinct processing modes, dependent on whether or not a user is supplying sampling points. The process determines (202) if the user is supplying sample points 204. If not, the process generates (206) closed LUT's as uniform LUTs with d number of steps as described in a table 208, exemplary contents of which are illustrated in Table 1 below:

TABLE 1

|  | Proof mode | Normal mode | Best mode |
|---|---|---|---|
| Number of Steps, d | 9 | 17 | 33 |

All the open LUT's of dimension k will have the same number of steps d(k) in each input channel, and the nodes are equally spaced, that is, for each i=1,2, ..., k, the 1-D sampling grid is:

$$Samp_i: 1/d(k), 2/d(k), \ldots, (d(k)-1)/d(k), 1$$

In this leg of the process, d(k) is specified in a portion of table 208, exemplary contents of which are illustrated in Table 2 below:

TABLE 2

|  | Proof mode | Normal mode | Best mode |
|---|---|---|---|
| Number of Steps for four channels, d(4) | 5 | 7 | 9 |
| Number of Steps for five channels, d(5) | 2 | 3 | 3 |
| Number of Steps for six channels, d(6) | 2 | 3 | 3 |
| Number of Steps for seven channels, d(7) | 2 | 2 | 2 |
| Number of Steps for eight or more channels, d(k) | 2 | 2 | 2 |

The three modes, "proof", "normal" and "best", are quality settings that normally exist in Color Management Module (CMM) software allowing a user to choose a quality based on the user's application. In the exemplary embodiment of the present invention, the proof mode has the smallest memory footprint, while best mode has the largest.

If it is determined that a user wants to supply sampling points, the process generates (210) LUTs using an external input in the form of a list of "important" sampling locations. This leg of the process is more adaptive than the table driven leg, and can also save more memory space.

The external input is an array of device values supplied by the user. These device values will indicate which region of the device color space is important, that is, which region of the device color space should be sampled at a higher density or rate.

As before, all the closed LUTs generated by this leg of the process will be uniform with d number of steps as described in Table 1 from above. However, each open LUT can have a different number of steps in each input channel, and the sampling locations do not need to be equally spaced.

Figure 3:
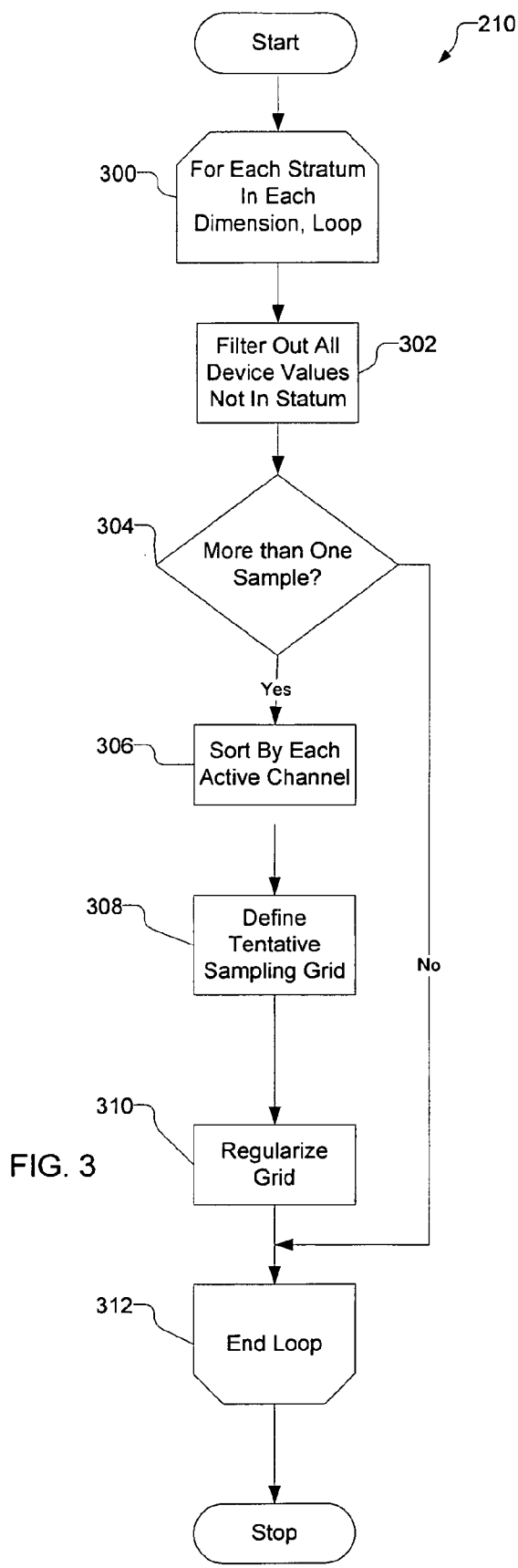
FIG. 3 is a process used to generate LUTs using user specified sampling locations in accordance with an exemplary embodiment of the present invention.

FIG. 3 is a process used to generate LUTs using user specified sampling locations in accordance with an exemplary embodiment of the present invention. For a given open LUT stratum, there is associated with it a colorant combination, say $c_1, \ldots, c_k$ where the $c_i$'s are distinct integers between 1 and n. They are the channel indices corresponding to the colorants that are "active" in this stratum.

A LUT process generation process 210 loops (300 to 312) for each stratum in each dimension k, that is, for each of the active channels indexed by i=1,2, . . . ,k, performing the following steps.

The process filters (302) out from an input array of user specified sampling points all device values that are not contained in the stratum being processed. A device value $(x_1, x_2, \ldots, x_n)$ is contained in the stratum if and only if $x_{c_1} > 0, x_{c_2} > 0, \ldots x_{c_k} > 0$ and all other channels are zero. If the filtered set has N entries, let $d_{tentative} = \min(d(k), \max(1, \text{int}(N^{1/k})))$ where d(k) is also given by Table 2 from above. d(k) imposes an upper bound on the size of the LUT so that, if N is large, that is, there are a lot of samples in this stratum, the size of the LUT doesn't go out of control. At the other extreme, if N=0, a one-step LUT is used.

The process determines (304) If $d_{tentative}=1$, $Samp_i$ has only 1 point, which is set to 1.0, as it must be. If so, the process continues to the next stratum, otherwise, the process continues processing.

The process then sorts (306) the filtered samples in ascending order in the $c_i$th channel.

Once the filtered samples are sorted, the process defines (308) the "tentative" sampling grid for the ith active channel ($c_i$th in the full device space) using the nodes $x_j=(j-1)\cdot 100/(d_{tentative}-1)$ percentile where $j=1,2, \ldots, d_{tentative}$.

The process regularizes (310) the tentative grid to ensure that the grid conforms with strict monotonicity and also that the grid ends with 1.0. Because the filtered samples are already sorted in the $c_i$th channel, the nodes in the tentative grid are already monotonic non-decreasing. However, adjacent nodes might be identical. This can be corrected by removing identical nodes if necessary. Finally, after this procedure, if the end point is less than 1.0, it is replaced by 1.0.

Note that the regularizing process may result in a LUT stratum having a different number of steps in each channel, because after the regularization, the number of steps in a channel may be less than $d_{tentative}$.

At the end of the stratification process, using either table values or values supplied by a user, the unit hypercube is stratified by a strata collection having open and closed LUT strata.

Figure 4:
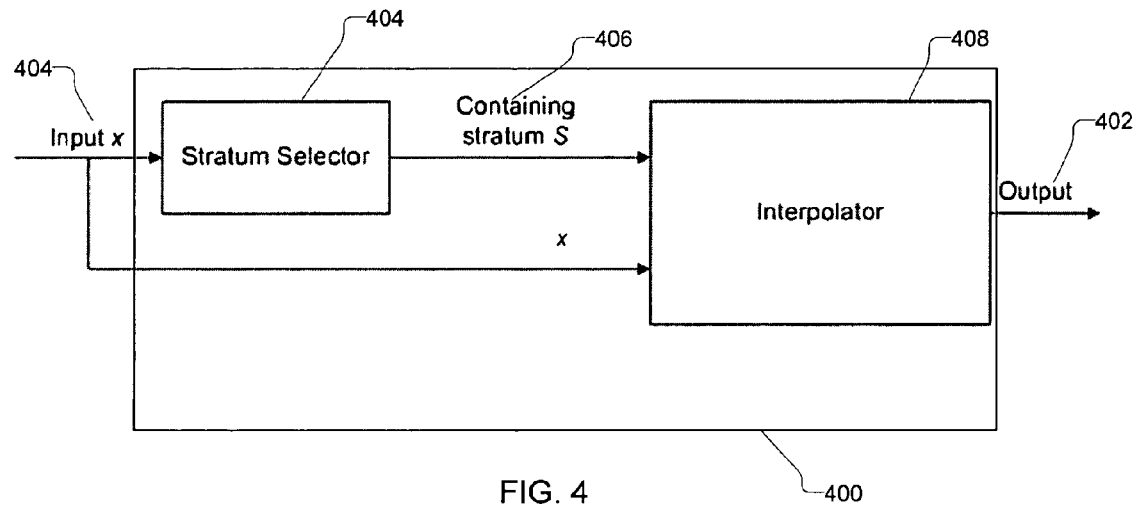
FIG. 4 is a block diagram of an interpolation module in accordance with an exemplary embodiment of the present invention.

FIG. 4 is a block diagram of an interpolation module in accordance with an exemplary embodiment of the present invention. An interpolation module 400 uses a strata collection to generate an output color value 402 from an input device value 404. To generate the output color value, the interpolation module receives the input device value which is given by a set of channel values, namely $(x_1, x_2, \ldots, x_n)$. The interpolation module uses a stratum selector 404 to select a stratum 406 from the strata collection containing the input device value. The containing stratum and the input device value are then used by an interpolator 408 to generate the output color value.

Figure 5:
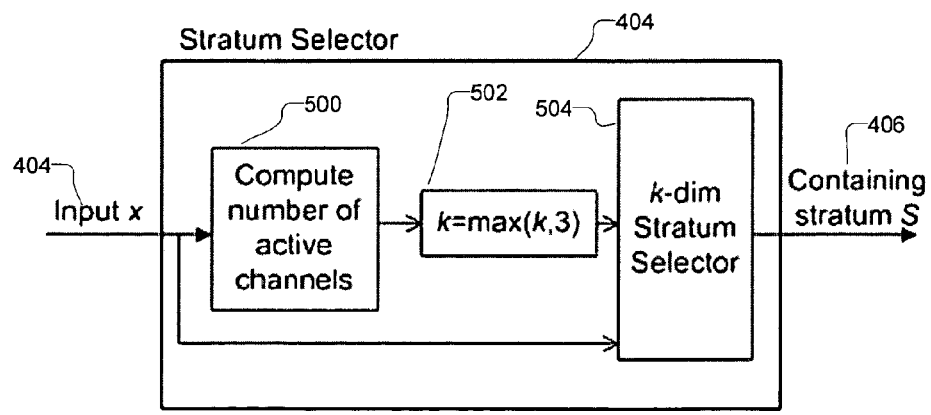
FIG. 5 is a block diagram of a stratum selector in accordance with an exemplary embodiment of the present invention.

FIG. 5 is a block diagram of a stratum selector in accordance with an exemplary embodiment of the present invention. The stratum selector 404 computes (500) the number of "active" channels. This is simply the number of non-zero channels in the input device color. This determines the strata dimension k in which the stratum selector searches for the containing stratum. More precisely, the stratum selector sets (502) the strata dimension as 3 if the number of active channels is ≦3, otherwise the strata dimension is the same as the number of active channels. The stratum selector then uses a k-dim stratum selector 504 to select the individual stratum to be used in an interpolation.

Figure 6:
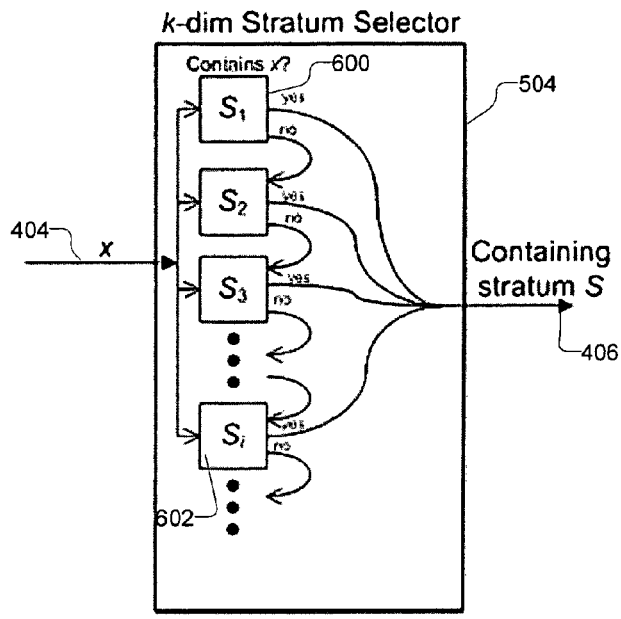
FIG. 6 is a block diagram of a k-dim stratum selector in accordance with an exemplary embodiment of the present invention.

FIG. 6 is a block diagram of a k-dim stratum selector in accordance with an exemplary embodiment of the present invention. The k-dim stratum selector 504 searches within the strata collection, $\Sigma_k$, for the stratum containing the input device value. A device value is contained in an open stratum if all the channels corresponding to the stratum have non-zero value, and all other channels are zero. A device value is contained in a closed stratum if the device value is 0 in every non-active channel for the stratum. The k-dim stratum selector determines if the device value is in a first stratum, $S_1$ 600. If not, the k-dim stratum selector tries each stratum, $S_i$ 602, in succession until it finds a containing stratum. If no containing stratum is found, the k-dim stratum selector aborts and reports a failure. If a containing stratum 406 is found, an interpolated output value can be generated from the input device value and the containing stratum.

Figure 7:
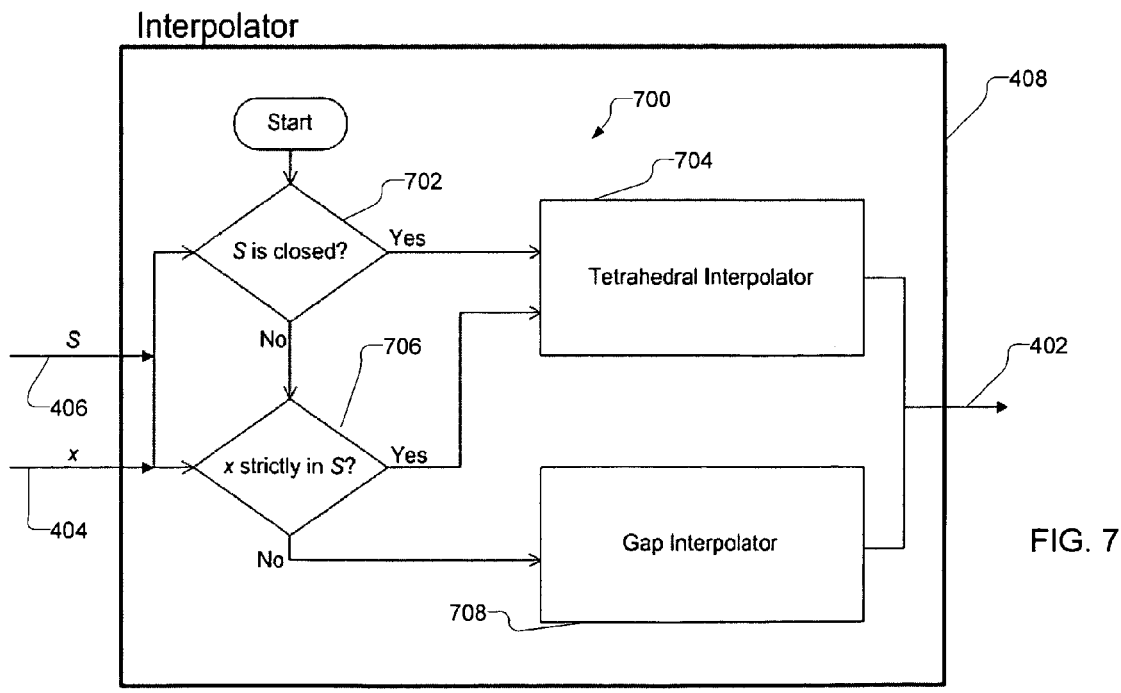
FIG. 7 is a process flow diagram of an interpolation process used by an interpolator in accordance with an exemplary embodiment of the present invention.

FIG. 7 is a process flow diagram of an interpolation process used by an interpolator in accordance with an exemplary embodiment of the present invention. An interpolator 408 (of FIG. 4) uses an interpolation process 700 to generate an output color value 402 from an input device value 404 and a containing stratum 406. The interpolator determines (702) if the containing stratum is closed. If so, interpolation within can be done by a conventional interpolation process that works for nodes in a hypercube. In one embodiment of the present invention, a tetrahedral interpolator 704 is used. If the interpolator determines (706) that the containing stratum is open, and the device value lies strictly within the stratum, that is, $x_i \geq$ value of the first node in the ith channel for every index i that corresponds to an active channel of the stratum, then the same, standard, interpolation process (such as the process used by the tetrahedral interpolator) can be used.

If, on the other hand, if $x_i <$ value of the first node in the ith channel for some active channel index i, then the device value falls into a "gap" between the stratum and the lower dimensional subspaces. Any process that is capable of interpolating within this gap, such as a gap process used by gap interpolator 708, can be used, although a preferred gap interpolator uses a transfinite interpolation algorithm described in copending U.S. application Ser. No. 11/042,140, filed Jan. 26, 2005, entitled "COLOR CONVERSION USING BARYCENTRIC PROJECTIONS", the contents of which are hereby incorporated by reference as if stated in full herein. Typically, a process that is capable of performing such an interpolation is more complex than any of the conventional interpolation processes, such as one using a tetrahedral interpolation algorithm.

Use of strata collections to span a unit hypercube during a color conversion process for a high-fidelity color has several advantages as compared to use of a single uniform LUT. As explained earlier, the resultant sparse LUT structure is able to achieve reasonably dense sampling in regions of the device space that contain important combinations of colorants, while keeping in check the total size of LUT's needed. Table 3 below shows a comparison of the number of nodes needed for the present sparse LUT implementation (using the table driven LUT generation process as described above) and the corresponding uniform LUT implementation. As can be seen from the table, use of the present sparse LUT system results in smaller, and therefore more manageable, LUT sizes.

| Number of input channels | Sparse LUT structure (normal mode) | Uniform LUT (17 steps) |
|---|---|---|
| 5 | 142498 | 1419857 |
| 6 | 217582 | 24137569 |
| 7 | 347444 | 410338673 |
| 8 | 559618 | 6975757441 |

Figure 8:
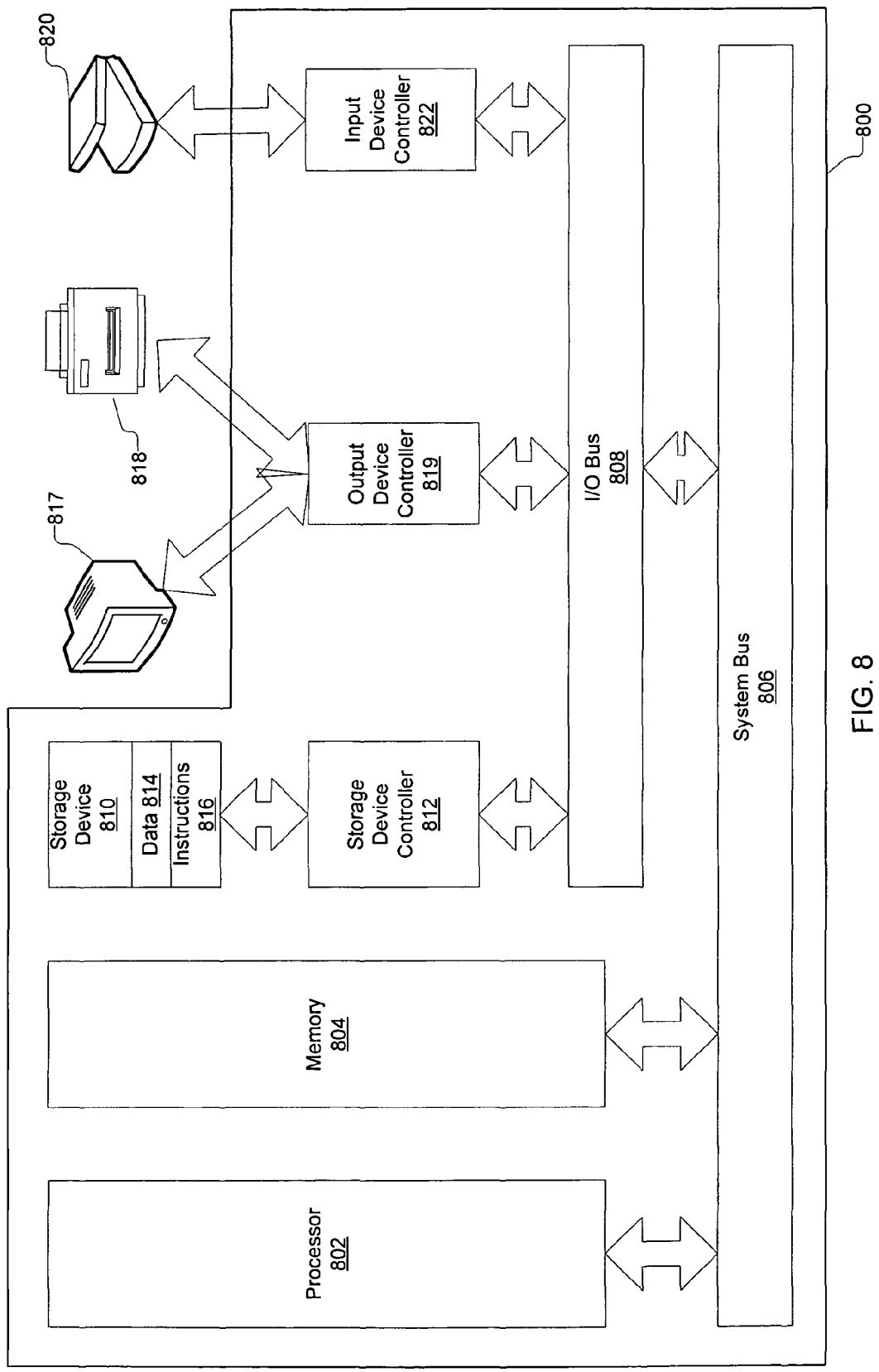
FIG. 8 is a block diagram of a data processing system, such as a computer coupled to color devices and having a color management module, that may be used to host an interpolation module in accordance with an exemplary embodiment of the present invention.

FIG. 8 is a block diagram of a data processing system, such as a computer coupled to color devices and having a color management module, that may be used to host an interpolation module as described above in accordance with an exemplary embodiment of the present invention. The data processing system 800 includes a processor 802 coupled to a memory 804 via system bus 806. The processor is also coupled to external Input/Output (I/O) devices via the system bus and an I/O bus 808. A storage device 810 having computer system readable media is coupled to the processor via a storage device controller 812 and the I/O bus and the system bus. The storage device is used by the processor to store and read data 814 and program instructions 816 used to implement an interpolation process as described above. The processor may be further coupled to color output devices, such as computer display 817 and color printer 818, via an output device controller 819 coupled to the I/O bus. The processor may also be coupled to a color input device, such as color scanner 820, via an input device controller 822.

In operation, the processor loads the program instructions from the storage device into memory. The processor then executes the loaded program instructions to receive an input color value in a first color space, such as a color value meant for use by the color printer. The processor then executes the program instructions to generate an output color value in a second color space, such as a color value for use by the display, as described above.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A method of generating a set of LUTs that span a unit hypercube in an n ($n \geq 5$) dimensional input color space, each LUT outputting output color data in a m-dimensional output color space, the method comprising:
    using a processor coupled to a memory to define in the memory a set of strata collections for the n-dimensional color space,
    wherein, for each dimension k where k=3 to n dimensions, defining a strata collection of n-choose-k LUTs, each LUT having k-dimensional inputs and outputs, and
    wherein the grid structure for higher dimension LUTs is less dense than lower dimension LUTs,
    wherein each LUT in the strata collection of n-choose-k LUTs is either a closed LUT or an open LUT,
    wherein each grid structure of a closed LUT and each grid structure of an open LUT is defined by k one-dimensional sampling grids:

$$\text{Samp}_i: x_1, x_2, \ldots, x_{d(i)}$$

$d(i) \geq 1$ is the number of steps for the ith channel sampling,
    wherein the closed LUT is a LUT with the additional requirement that for each $\text{Samp}_i$, $x_1=0$, $x_{d(i)}=1$, and $d(i) \geq 2$,
    wherein the open LUT is a LUT with the additional requirement that for each $\text{Samp}_i$, $x_1>0$, $x_{d(i)}=1$, and
    wherein for a k-dimensional subspace, an open LUT of such subspace leaves a gap in such subspace between the open LUT of such subspace and an open or closed LUT for a lower dimensional subspace of such subspace, and
    populating the LUTs in the memory with values from the output color space.

2. The method of claim 1, wherein for k=3, each LUT is closed.

3. The method of claim 2, wherein the grid structure for each LUT is uniform.

4. The method of claim 1, wherein for k=4, at least one LUT is closed and all other LUTs are open.

5. The method of claim 4, wherein the grid structure for each closed LUT is uniform and the grid structure for each open LUT is nonuniform.

6. The method of claim 5, wherein the placement of nodes in the nonuniform grid structure is determined by a pre-defined table.

7. The method of claim 5, wherein the placement of nodes in the nonuniform grid structure is determined by a user-supplied array of values in the n-dimensional color space.

8. The method of claim 1, wherein for k>4, all of the LUTs are open.

9. The method of claim 8, wherein the grid structure for each closed LUT is uniform and the grid structure for each open LUT is nonuniform.

10. The method of claim 9, wherein the placement of nodes in the nonuniform grid structure is determined by a pre-defined table.

11. The method of claim 9, wherein the placement of nodes in the nonuniform grid structure is determined by a user-supplied array of values in the n-dimensional color space.

12. A method of color conversion using the strata collection generated in any of claims 1 to 11, the color conversion method comprising:
    interpolating output color values for input color values within closed LUTs and interior portions of open LUTs using a first interpolation process; and
    interpolating output color values for input color values within a gap between an open LUT and a lower dimensional subspace, using a second interpolation process that is more computationally complex than the first interpolation process.

13. Computer-executable instructions stored on a non-transitory computer readable medium, the computer-executable instructions executable to generate a set of LUTs that span a unit hypercube in an n-dimensional color space, each LUT mapping from the n-dimensional color space to a second color space using a method according to any of claims 1 to 11.

14. Computer-executable instructions stored on a non-transitory computer readable medium, said computer-executable instructions for color conversion using the strata collection generated in any of claims 1 through 11, the computer-executable instructions comprising: interpolating output color values for input color values within closed LUTs and interior portions of open LUTs using a first interpolation process; and interpolating output color values for input color values within spaces between an open LUT and a lower dimensional subspace, using a second interpolation process that is more computationally complex than the first interpolation process.

15. A non-transitory computer-readable medium having computer-executable instructions stored thereon, the computer-executable instructions executable to generate a set of LUTs that span a unit hypercube in an n-dimensional color space, each LUT mapping from the n-dimensional color space to a second color space using a method according to any of claims 1 to 11.

16. A non-transitory computer-readable medium having computer-executable instructions stored thereon, said computer-executable instructions for color conversion using the strata collection generated in any of claims 1 through 11, the computer-executable instructions comprising: interpolating output color values for input color values within closed LUTs and interior portions of open LUTs using a first interpolation process; and interpolating output color values for input color values within a gap between an open LUT and a lower dimensional subspace, using a second interpolation process that is more computationally complex than the first interpolation process.

17. An apparatus for generating a set of LUTs that span a unit hypercube in an n-dimensional color space, each LUT mapping from the n-dimensional color space to a second color space, the apparatus comprising:
a processor; and
a program memory coupled to the processor and having programming instructions executable by the processor stored therein, the programming instructions executable to perform a method according to any of claims 1 to 11.

18. An apparatus for color conversion using the strata collection generated in any of claims 1 through 11, the apparatus comprising:
a processor; and
a program memory coupled to the processor and having programming instructions executable by the processor stored therein, the programming instructions comprising:
interpolating output color values for input color values within closed LUTs and interior portions of open LUTs using a first interpolation process; and
interpolating output color values for input color values within gap between an open LUT and a lower dimensional subspace, using a second interpolation process that is more computationally complex than the first interpolation process.

19. An apparatus for color conversion using a set of LUTs that span a unit hypercube in an n ($n \geq 5$) dimensional input color space, each LUT outputting output color data in a m dimensional output color space, the apparatus comprising:
a storing unit constructed to store a set of strata collections for the n-dimensional color space,
wherein, for each dimension k where k=3 to n dimensions, a strata collection of n-choose-k LUTs is defined, each LUT having k dimensional inputs and outputs, and
wherein each LUT in the strata collection of n-choose-k LUTs is either a closed LUT or an open LUT,
wherein each grid structure of a closed LUT and each grid structure of an open LUT is defined by k one-dimensional sampling grids:

$$Samp_i: x_1, x_2, \ldots, x_{d(i)}$$

$d(i) \geq 1$ is the number of steps for the ith channel sampling,
wherein the closed LUT is a LUT with the additional requirement that for each $Samp_i$, $x_1=0$, $x_{d(i)}=1$, and $d(i) \geq 2$,
wherein the open LUT is a LUT with the additional requirement that for each $Samp_i$, $x_1>0$, $x_{d(i)}=1$, and
wherein for a k-dimensional subspace, an open LUT of such subspace leaves a gap in such subspace between the open LUT of such subspace and an open or closed LUT for a lower dimensional subspace of such subspace,
wherein the apparatus further comprises:
a computing unit constructed to compute a number of active channels of input color data represented by the n-dimensional input color space;
a selecting unit constructed to select, based on the number of active channels, a stratum corresponding to the input color data form the set of strata collections; and
an interpolator constructed to interpolate output color data for the input color data.

20. A method for color conversion using a set of LUTs that span a unit hypercube in an n ($n \geq 5$) dimensional input color space, each LUT outputting output color data in a m dimensional output color space, the method comprising the steps of:
storing a set of strata collections for the n-dimensional color space in a storing unit,
wherein, for each dimension k where k=3 to n dimensions, a strata collection of n-choose-k LUTs is defined, each LUT having k dimensional inputs and outputs, and
wherein each LUT in the strata collection of n-choose-k LUTs is either a closed LUT or an open LUT,
wherein each grid structure of a closed LUT and each grid structure of an open LUT is defined by k one-dimensional sampling grids:

$$Samp_i: x_1, x_2, \ldots, x_{d(i)}$$

$d(i) \geq 1$ is the number of steps for the ith channel sampling,
wherein the closed LUT is a LUT with the additional requirement that for each $Samp_i$, $x_1=0$, $x_{d(i)}=1$, and $d(i) \geq 2$,
wherein the open LUT is a LUT with the additional requirement that for each $Samp_i$, $x_1>0$, $x_{d(i)}=1$, and
wherein for a k-dimensional subspace, an open LUT of such subspace leaves a gap in such subspace between the open LUT of such subspace and an open or closed LUT for a lower dimensional subspace of such subspace,
wherein the method further comprises the steps of:
computing a number of active channels of input color data represented by the n-dimensional input color space;
selecting, based on the number of active channels, a stratum corresponding to the input color data from the set of strata collections; and
interpolating output color data for the input color data.

21. A non-transitory computer-readable memory medium having computer-executable process steps retrievably stored thereon, for color conversion using a set of LUTs that span a unit hypercube in an n ($n \geq 5$) dimensional input color space, each LUT outputting output color data in a m dimensional output color space, wherein said process steps comprise:
a storing step to store a set of strata collections for the n-dimensional color space,
wherein, for each dimension k where k=3 to n dimensions, a strata collection of n-choose-k LUTs is defined, each LUT having k dimensional inputs and outputs, and
wherein each LUT in the strata collection of n-choose-k LUTs is either a closed LUT or an open LUT, wherein each grid structure of a closed LUT and each grid structure of an open LUT is defined by k one-dimensional sampling grids:

$$\text{Samp}_i: x_1, x_2, \ldots, x_{d(i)}$$

$d(i) \geq 1$ is the number of steps for the ith channel sampling, wherein the closed LUT is a LUT with the additional requirement that for each $\text{Samp}_i$, $x_1=0$, $x_{d(i)}=1$, and $d(i) \geq 2$, wherein the open LUT is a LUT with the additional requirement that for each $\text{Samp}_i$, $x_1>0$, $x_{d(i)}=1$, and wherein for a k-dimensional subspace, an open LUT of such subspace leaves a gap in such subspace between the open LUT of such subspace and an open or closed LUT for a lower dimensional subspace of such subspace, wherein said process steps further comprise:

a computing step to compute a number of active channels of input color data represented by the n-dimensional input color space;

a selecting step to select, based on the number of active channels, a stratum corresponding to the input color data from the set of strata collections; and an interpolating step to interpolate output color data for the input color data.

22. A method according to claim 1, wherein with respect to the open LUT and the additional requirement of $x_1>0$, not all the color spaces defined by k-dimensional inputs, which are input color spaces of the LUT, are covered.

* * * * *

UNITED STATES PATENT AND TRADEMARK OFFICE
CERTIFICATE OF CORRECTION

PATENT NO. : 8,120,617 B2  
APPLICATION NO. : 11/042106  
DATED : February 21, 2012  
INVENTOR(S) : Siu-Kei Tin et al.

Page 1 of 1

It is certified that error appears in the above-identified patent and that said Letters Patent is hereby corrected as shown below:

In column 11, line 2, in Claim 14, delete "spaces" and insert -- a gap --, therefor.

In column 11, line 47, in Claim 18, after "within" insert -- a --.

In column 12, line 18, in Claim 19, delete "form" and insert -- from --, therefor.

Signed and Sealed this
Twenty-fifth Day of December, 2012

David J. Kappos
*Director of the United States Patent and Trademark Office*